(12) United States Patent
Koide et al.

(10) Patent No.: US 11,771,018 B2
(45) Date of Patent: Oct. 3, 2023

(54) BLOWER

(71) Applicant: Makita Corporation, Anjo (JP)

(72) Inventors: Yuki Koide, Anjo (JP); Makoto Takahashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 195 days.

(21) Appl. No.: 16/896,451

(22) Filed: Jun. 9, 2020

(65) Prior Publication Data

US 2020/0390041 A1 Dec. 17, 2020

(30) Foreign Application Priority Data

Jun. 14, 2019 (JP) ................................. 2019-111363

(51) Int. Cl.
*A01G 20/47* (2018.01)
*A47L 5/14* (2006.01)
*A45F 3/14* (2006.01)
*A47L 5/36* (2006.01)
*F04D 25/06* (2006.01)
*F04D 25/08* (2006.01)

(52) U.S. Cl.
CPC ............... *A01G 20/47* (2018.02); *A47L 5/14* (2013.01); *A45F 2003/146* (2013.01); *A47L 5/36* (2013.01); *F04D 25/0673* (2013.01); *F04D 25/08* (2013.01)

(58) Field of Classification Search
CPC ............... A01G 20/47; A45F 2003/146; A45F 2200/0575; A47L 5/14; A47L 5/36; F04D 17/16; F04D 25/0673; F04D 25/08; F04D 29/4226; F04D 29/602
See application file for complete search history.

(56) References Cited

U.S. PATENT DOCUMENTS 6,305,048 B1 * 10/2001 Salisian ................. A47L 9/322
15/327.5
9,907,234 B2 * 3/2018 Poole ........................ A47L 5/14
(Continued)

FOREIGN PATENT DOCUMENTS

CN 103534413 A 1/2014
CN 103603817 A 2/2014
(Continued)

OTHER PUBLICATIONS

Toro UltraPlus Blower/Vacuum Operator's Manual—2017 (Year: 2017).*

(Continued)

*Primary Examiner* — Marc Carlson
(74) *Attorney, Agent, or Firm* — Sughrue Mion, PLLC (57) ABSTRACT

A blower may include: a volute case defining a suction port, a volute chamber, and a discharge port; an impeller rotatably supported within the volute chamber; a motor connected to the impeller and configured to drive the impeller; and an outer case accommodating the suction port of the volute case and the motor. The outer case may include an external suction port and define an air passage extending from the external suction port to the suction port of the volute case. When the blower is held or worn in a predetermined posture by a user, the external suction port of the outer ease may be configured to be located so as to be open vertically downward.

17 Claims, 7 Drawing Sheets

(56) References Cited

U.S. PATENT DOCUMENTS

| | | | |
|---|---|---|---|
| 10,645,884 B2* | 5/2020 | Poole | A47L 5/14 |
| 2002/0108211 A1* | 8/2002 | Svoboda | E01H 1/0836 |
| | | | 416/235 |
| 2004/0188230 A1* | 9/2004 | Tate | A47L 5/14 |
| | | | 200/43.17 |
| 2006/0162116 A1 | 7/2006 | Andresen et al. | |
| 2008/0172826 A1* | 7/2008 | Rappin | A01B 1/065 |
| | | | 15/327.5 |
| 2012/0138058 A1 | 6/2012 | Fu et al. | |
| 2012/0234412 A1* | 9/2012 | Prager | A01G 20/47 |
| | | | 137/565.01 |
| 2014/0140861 A1 | 5/2014 | Pellenc | |
| 2014/0147252 A1* | 5/2014 | Takano | F04D 29/666 |
| | | | 416/54 |
| 2015/0113758 A1* | 4/2015 | Nashimoto | A01G 20/47 |
| | | | 15/327.5 |
| 2015/0113760 A1* | 4/2015 | Fukunaga | H05F 3/025 |
| | | | 15/330 |
| 2015/0237808 A1* | 8/2015 | Prager | E01H 1/0809 |
| | | | 15/405 |
| 2016/0108924 A1* | 4/2016 | Conrad | F04D 25/0673 |
| | | | 417/423.7 |
| 2016/0198636 A1* | 7/2016 | Poole | A01G 20/47 |
| | | | 15/327.5 |
| 2016/0265540 A1* | 9/2016 | Tirone | A01G 20/47 |
| 2017/0074286 A1 | 3/2017 | Kreidler et al. | |
| 2017/0311551 A1* | 11/2017 | von Krane | A01G 20/47 |
| 2018/0080453 A1* | 3/2018 | Yamamoto | H02P 5/74 |
| 2018/0094393 A1* | 4/2018 | Takahashi | F04D 25/08 |
| 2018/0163750 A1* | 6/2018 | Landén | F04D 25/08 |
| 2018/0206620 A1* | 7/2018 | Yamaoka | A47L 5/14 |
| 2019/0029191 A1* | 1/2019 | Poole | A47L 5/14 |
| 2019/0045725 A1* | 2/2019 | Shangguan | F04D 25/0673 |
| 2019/0104694 A1 | 4/2019 | Hoffman et al. | |
| 2022/0010798 A1 | 1/2022 | Hoffman et al. | |

FOREIGN PATENT DOCUMENTS

| | | | | |
|---|---|---|---|---|
| CN | 106545503 A | 3/2017 | | |
| CN | 206647279 U | 11/2017 | | |
| CN | 109654044 A | 4/2019 | | |
| DE | 10 2005 003 275 A1 | 7/2006 | | |
| JP | 2016-204929 A | 12/2016 | | |
| JP | 2016-204930 A | 12/2016 | | |
| JP | 2017-186915 A | 10/2017 | | |
| WO | 2016/171136 A1 | 10/2016 | | |
| WO | WO-2017118276 A1 * | 7/2017 | | A01G 1/12 |
| WO | WO-2017133458 A1 * | 8/2017 | | H01H 19/02 |

OTHER PUBLICATIONS

Office Action dated Dec. 20, 2022, issued in Japanese Application No. 2019-111363.

Chinese Office Action dated May 12, 2023 in Chinese Application No. 202010466484.4.

* cited by examiner

BLOWER

CROSS-REFERENCE TO RELATED APPLICATION

This application claims priority to Japanese Patent Application No. 2019-111363, filed on Jun. 14, 2019, the entire contents of which are incorporated herein by reference.

TECHNICAL FIELD

The disclosure herein relates to a blower, which is a type of working machine.

BACKGROUND

A blower, which is a type of working machine, is known. The blower is held or worn in a predetermined posture by a user, and collects scattered objects such as fallen leaves or mowed grass by blowing air therefrom. A handheld blower and a backpack blower are widely used as such type of blower.

Japanese Patent Application Publication No. 2016-204930 describes a backpack blower. This blower is provided with a volute case, an impeller rotatably supported in a volute chamber of the volute case, a motor connected to the impeller and configured to drive the impeller, and an outer case accommodating a suction port of the volute case and the motor.

SUMMARY

In the aforementioned blower, the motor is arranged inside the outer case, thus noise of the motor is suppressed from spreading to its surroundings. However, an external suction port needs to be formed in the outer case to intake air into the volute case, and the noise of the motor thus inevitably leaks out from the external suction port. The disclosure herein provides art that can suppress such an influence of noise to surroundings.

The art disclosed herein is embodied as a blower configured to be held or worn in a predetermined posture by a user (such as a handheld blower or a backpack blower). The blower may comprise; a volute case defining a suction port, a volute chamber, and a discharge port; an impeller rotatably supported within the volute chamber; a motor connected to the impeller and configured to drive the impeller; and an outer case accommodating the suction port of the volute case and the motor. The outer case may comprise an external suction port and define an air passage extending from the external suction port to the suction port of the volute case. The external suction port may be located in the outer case such that the external suction port is directed to be open vertically downward when the blower is held or worn in the predetermined posture.

According to tire aforementioned configuration the external suction port of the outer case is open vertically downward (i.e., toward a ground) when the user uses the blower. Due to this, noise leaking from the external suction port is emitted primarily toward the ground, and thus the noise is suppressed from spreading to the surroundings.

DETAILED DESCRIPTION

In an embodiment of the art disclosed herein, a suction port of a volute case may be directed to be open horizontally when a blower is held or worn in Its predetermined posture. That is, a direction along which the suction port of the volute case is open may intersect perpendicularly or substantially perpendicularly (such as at 80 to 100 degrees) with a direction along which an external suction port of an outer case is open.

In an embodiment of the art disclosed herein, the outer case may comprise a bottom portion facing a ground when the blower is held or worn in the predetermined posture. In this case, the external suction port may be located at the bottom portion of the outer case. According to such a configuration, spread of noise leaking from the external suction port can further be suppressed by arranging the external suction port at a relatively low position.

In an embodiment of the art disclosed herein, the bottom portion of the outer case may comprise a ground contact face configured to contact the ground when a user places the blower on the ground. In this case, at least a part of the external suction port may be located at a position different from the ground contact face. According to such a configuration, complete closure of the external suction port by the ground can be avoided when the user places the blower on the ground.

In an embodiment of the art disclosed herein, the blower may further comprise at least one battery pack configured to supply electric power to a motor. In this case, at least a part of an air passage may extend along the at least one battery pack. According to such a configuration, the temperature rise in the battery pack can be suppressed by air flowing in the air passage.

In an embodiment of the art disclosed herein, the external suction port may comprise a first external suction port and a second external suction port. In this case, the air passage may comprise a first air passage extending from the first external suction port and a second air passage extending from the second external suction port. Further, the at least one battery pack may be located between the first air passage and the second air passage. According to such a configuration, the temperature rise in the battery pack can be suppressed efficiently by the air flowing in the air passage.

In an embodiment of the art disclosed herein, the blower may further comprise a motor controller configured to control electric power to be supplied to the motor. In this case, at least a part of the motor controller may be exposed to the air passage. According to such a configuration, the temperature rise in the motor controller can effectively be suppressed by the air flowing in the air passage.

In an embodiment of the art disclosed herein, the blower may be a backpack blower configured to be worn in the predetermined posture on a back of the user. Alternatively, as another embodiment, the blower may be a handheld blower that includes a grip configured to be gripped by the user and is configured to be held in the predetermined posture by the user. The predetermined posture mentioned herein is not limited to a certain standstill posture, and may be a posture that varies within a predetermined range depending on movement of the user.

In the aforementioned backpack blower, the motor may be located between the user and the volute case. In this case, the suction port of the volute case may be open rearward away from the user (i.e., in an opposite direction from the user).

In an embodiment of the art disclosed herein, an amount of air passing through the external suction port of the outer case may be not less than 95 percent of an amount of air passing through the suction port of the volute case. In other words, the outer case may substantially not include any other openings aside from the external suction port.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

A blower 10 of art embodiment will be described with reference to the drawings. The blower 10 of the present embodiment is a backpack blower, and is a type of working machine used primarily outdoors. The blower 10 is configured to be wont on a back of a user in a predetermined posture, and blow out air to collect scattered objects such as fallen leaves or mowed grass. The blower 10 is a working machine using a battery pack 2 as its power source, and is configured such that two battery packs 2 can be attached thereto. The number of the battery packs 2 is not limited to two.

As shown in FIGS. 1 to 4, the blower 10 comprises a volute pump 12, an outer case 14 accommodating the volute pump 12, and a pair of shoulder straps 16. The pair of shoulder straps 16 is fixed to the outer case 14 and is configured to hold the outer case 14 on the back of the user. The outer case 14 supports the volute pump 12 via a plurality of vibration-proofing members 13. The vibration-proofing members 13 are elastic members such as springs and rubbers. The outer case 14 in the present embodiment is configured of a plurality of segments (components) including a base member 14a and a cover member 14b, although this is merely an example. The cover member 14b is assembled onto the base member 14a, and the base member 14a and the cover member 14b oppose each other with the volute pump 12 interposed between them.

The outer case 14 includes two battery interfaces 18. Each of the battery interfaces 18 is configured such that one battery pack 2 can be detachably attached thereto. Each of the battery interfaces 18 includes battery terminals 18a. The battery terminals 18a are configured to electrically connect with the battery pack 2 attached to tire corresponding battery interface 18. The battery terminals 18a include a pair of electric power terminals and a plurality of communication terminals. The number of the battery interfaces 18 is not limited to two, and the blower 10 may include at least one battery interface 18.

The blower 10 includes a discharge nozzle 20 connected to the volute pump 12, and an operation grip 22 disposed on the discharge nozzle 20. The operation grip 22 includes a plurality of switches to be operated by the user, such as a trigger 24. When the user operates the trigger 24, electric power is supplied from one or two of the battery packs 2 to the volute pump 12, and the volute pump 12 is thereby actuated. Due to this, the blower 10 discharges air from the discharge nozzle 20.

The volute pump 12 comprises a volute case 26, an impeller 28 located within the volute case 26, and a motor 30 connected to the impeller 28. The volute case 26 defines a suction port 26a, a volute chamber 26b, and a discharge port 26c. The volute chamber 26b extends between the suction port 26a and the discharge port 26c in a volute shape. The impeller 28 is fixed to a rotation shaft 30a of the motor 30, and is rotatably supported in the volute chamber 26b. The motor 30 is configured to rotate the impeller 28 by receiving electric power supply from the battery pack(s) 2. When the impeller 28 is rotated, air suctioned from the suction port 26a is accelerated in the volute chamber 26b, and is thereafter discharged from the discharge port 26c. The discharge nozzle 20 is connected to the discharge port 26c of the volute case 26. Although not particularly limited, the motor 30 of the blower 10 of the present embodiment is located between lire user and the volute case 26 and the suction port 26a of the volute case 26 is open rearward away from the user (that is, in an opposite direction from the user) when the user wears the blower 10 in the predetermined posture.

Here, the discharge pert 26c of the volute case 26 is located outside the outer ease 14. The volute ease 26 includes a discharge duct 26d extending out beyond the outer ease 14, and the discharge port 26c is located at a distal end of the discharge duct 26d. A duct opening 14c through which the discharge duct 26d passes is disposed in the outer case 14. As aforementioned, the outer case 14 supports the volute pump 12 via the plurality of vibration proofing members 13. As such, a clearance is provided between the discharge duct 26d and the duct opening 14c, which allows a relative displacement of the volute case 26 relative to the outer case 14.

On the other hand, most part of the volute pump 12 including the motor 30 is located within the outer case 14. Especially because the suction port 26a of the volute case 26 is located within the outer case 14, the outer case 14 includes external suction ports 40a, 40b. The external suction ports 40a, 40b are one or more openings formed in the outer ease 14, further, air passages 42, 42a, 42b extending from the external suction ports 40a, 40b to the suction port 26a of the volute case 26 are defined in the outer ease 14.

The blower 10 further includes a motor controller 32. The motor controller 32 is electrically connected to the battery terminals 18a and the motor 30. Due to this, electric power discharged from the batters pack(s) 2 is supplied to the motor 30 through the motor controller 32. The motor controller 32 includes one or more power switching elements, and is configured to control the electric power to be supplied to the motor 30. Although not particularly limited, the motor 30 in the present embodiment is a brushless DC motor, and the motor controller 32 includes an inverter circuit. The motor controller 32 is exposed to the air passage 42 in the outer case 14, Due to this, the temperature rise in the motor controller 32 can be suppressed by the air flowing in the air passage 42.

The motor controller 32 is assembled onto a unit holder 34, Further, the unit holder 34 is located inside the outer case 14 and is assembled onto the outer case 14. In addition to the motor controller 32, the battery terminals 18a are also assembled onto the unit holder 34. For such a configuration, the motor controller 32 and the battery terminals 18a are firstly assembled onto the unit holder 34 in a manufacturing process of the blower 10. Then, this unit holder 34 with the motor controller 32 and the battery terminals 18a assembled thereon is assembled onto the base member 14a of the outer case 14. Since the motor controller 32 and the battery terminals 18a do not need to be assembled individually to the outer case 14, the assembly of the motor controller 32 and the battery terminals 18a can easily be carried out.

The specific configuration of the unit holder 34 is not particularly limited. However, in the blower 10 of the present embodiment, the unit holder 34 is assembled onto both the base member 14a (first segment) and the cover member 14b (second segment). According to such a configuration, rigidity of the outer case 14 can be increased by the unit holder 34. Further, since the unit holder 34 is stably fixed to the outer ease 14, vibrations in the motor controller 32 and the battery terminals 18a can be suppressed. This can prevent electrical defects (such as contact failure).

As aforementioned, since the motor 30 is disposed inside the outer case 14, the noise of the motor 30 is suppressed from spreading to the surroundings. However, the outer case 14 includes the external suction ports 40a, 40b, and the noise of the motor 30 thus inevitably leaks out through the external suction ports 40a, 40b. In regard to this, the external suction ports 40a, 40b are located at a bottom portion 14d of the outer case 14 in the blower 10 of the present embodiment. When the user wears the blower 10 in the predetermined posture, the bottom portion 14d of the outer case 14 faces the ground, and the external suction ports 40a, 40b are open vertically downward, That is, when the user uses the blower 10, the external suction ports 40a, 40b of the outer case 14 are open toward the ground. Due to this, the noise leaking out from the external suction ports 40a, 40b is emitted primarily toward the ground, and the noise is suppressed from spreading to the surroundings.

Here, in the aforementioned predetermined posture (i.e., the posture of the blower 10 when it is worn on the back of the user), the suction port 26a of the volute case 26 is open horizontally. That is, a direction along which the suction port 26a of the volute case 26 is open intersects perpendicularly with a direction along which the external suction ports 40a, 40b of the outer case 14 open. The direction along which the suction port 26a of the volute case 26 is open is parallel to the rotation shaft 30a of the motor 30, that is, it is also parallel to a rotation shaft of the impeller 28.

The positions of the external suction ports 40a, 40b are not limited to the bottom portion 14d of the outer case 14. Nonetheless, disposing the external suction ports 40a, 40b at the bottom portion 14d of the outer case 14 enables the external suction ports 40a, 40b to be located at relatively low positions when the user wears the blower 10 in the predetermined posture. This effectively suppresses spread of the noise leaking out from the external suction ports 40a, 40b to the surroundings. In view of this, it is desirable to position the external suction ports 40a, 40b close to the bottom portion 14d of the outer case 14. As such, the external suction ports 40a, 40b may be located below the rotation shaft 30a of the motor 30, for example, or may be located below the volute case 26.

In the blower 10 of the present embodiment, the bottom portion 14d of the outer case 14 includes a ground contact face 44 that contacts the ground when the user places the blower 10 on the ground. The external suction ports 40a, 40b are located at positions different from the ground contact face 44. If the external suction ports 40a, 40b are located on the ground contact face 44, the external suction ports 40a, 40b are completely closed by the ground when the user places the blower 10 on the ground, which is problematic when the motor 30 keeps rotating by its inertia. Due to this, at least a part of the external suction ports 40a, 40b can be arranged at positions different from the ground contact face 44.

Figure 4:
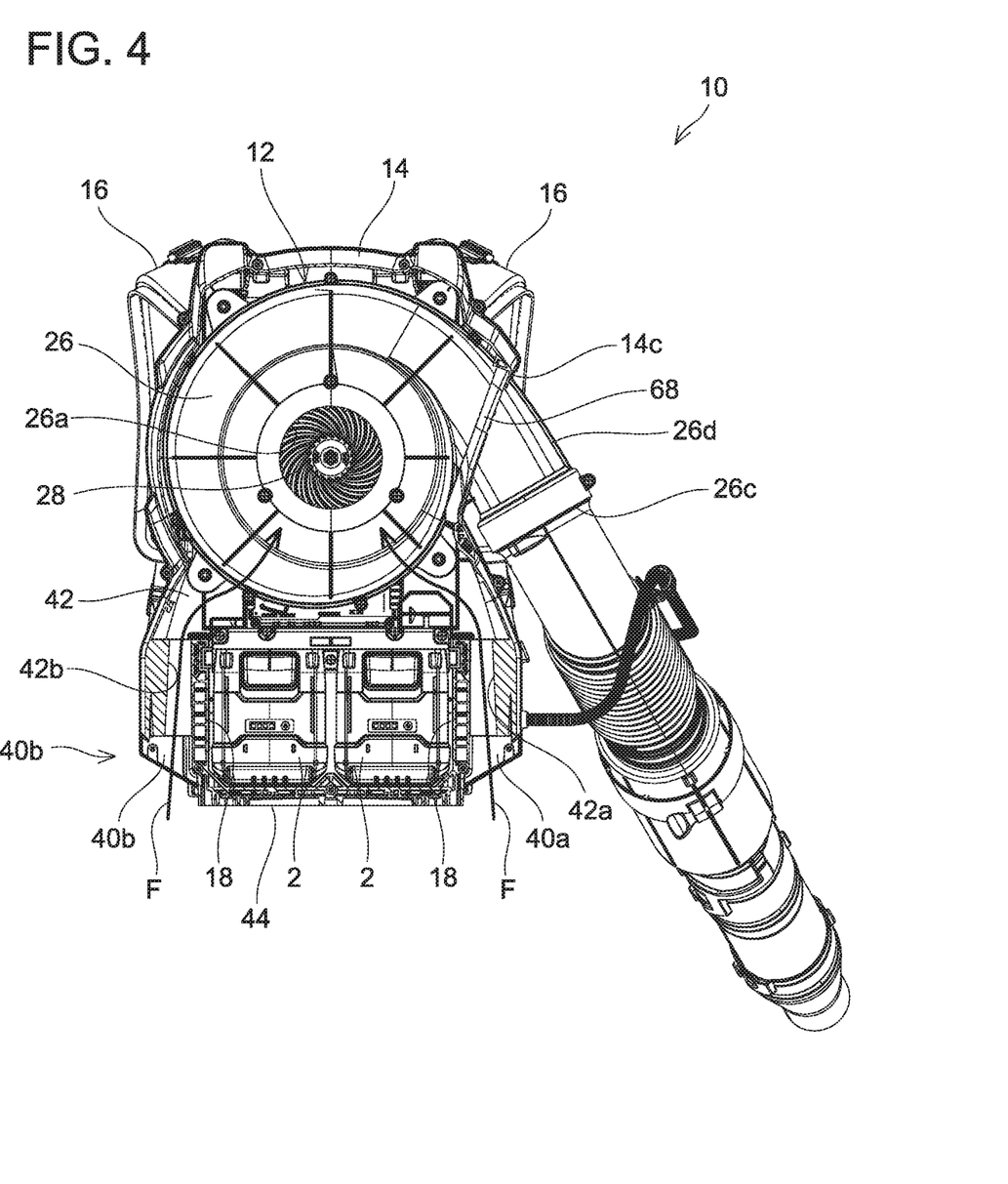
FIG. 4 is a diagram showing the internal structure of the blower 10 with a part of art outer case 14 removed. Arrows F In the drawing schematically show airflows in air passages 42, 42a, 42b.

As shown in FIG. 4, in the blower 10 of the present embodiment, the external suction ports 40a, 40b include the first external suction port 40a and the second external suction port 40b. Further, the air passages 42, 42a, 42b include the first air passage 42a extending upward from the first external suction port 40a and the second air passage 42b extending upward from the second external suction port 40b. The first air passage 42a and the second air passage 42b are disposed along the battery interlaces 18, and are adjacent to the battery packs 2 attached to the battery interfaces 18. According to such a configuration, the temperature rise in the battery packs 2 can be suppressed by air flowing in those air passages 42a, 42b.

Especially in the blower 10 of the present embodiment, the battery interfaces 18 are disposed between the first air passage 42a and the second air passage 42b. The first air passage 42a is adjacent to the battery pack 2 attached to one of the battery interfaces 18, and the second air passage 42b is adjacent to the battery pack 2 attached to the other one of the battery interfaces 18. Due to this, the temperature rise in each of the battery packs 2 can effectively be suppressed.

In the blower 10 of the present embodiment, an amount of air passing through the external suction ports 40a, 40b of the outer case 14 is not less than 95 percent of an amount of air passing through the suction port 26a of the volute case 26. In other words, the outer ease 14 substantially does not have any other opened openings other than the external suction ports 40a, 40b. This prevents the noise of the motor 30 from leaking out from portions of the outer case 14 that are other than the external suction ports 40a, 40b.

Figure 5:
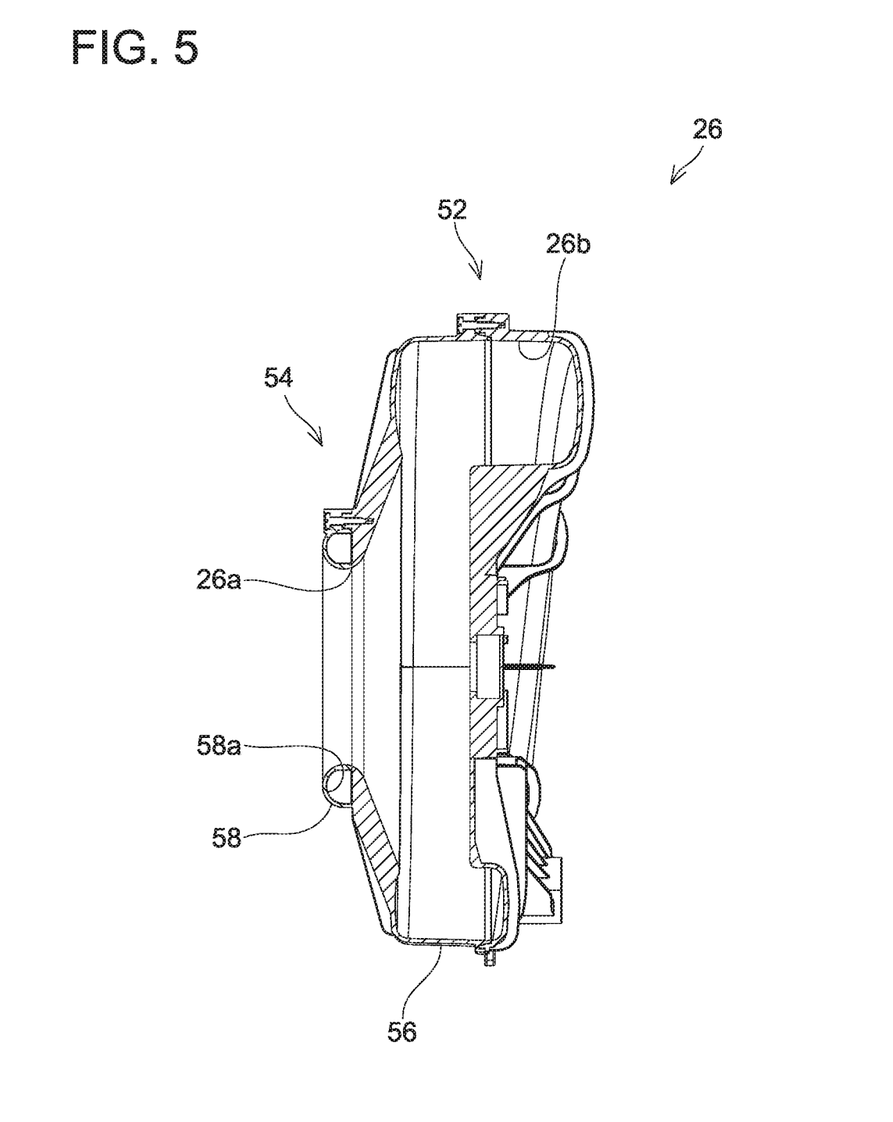
FIG. 5 is a cross-sectional view of a volute case.
Figure 6:
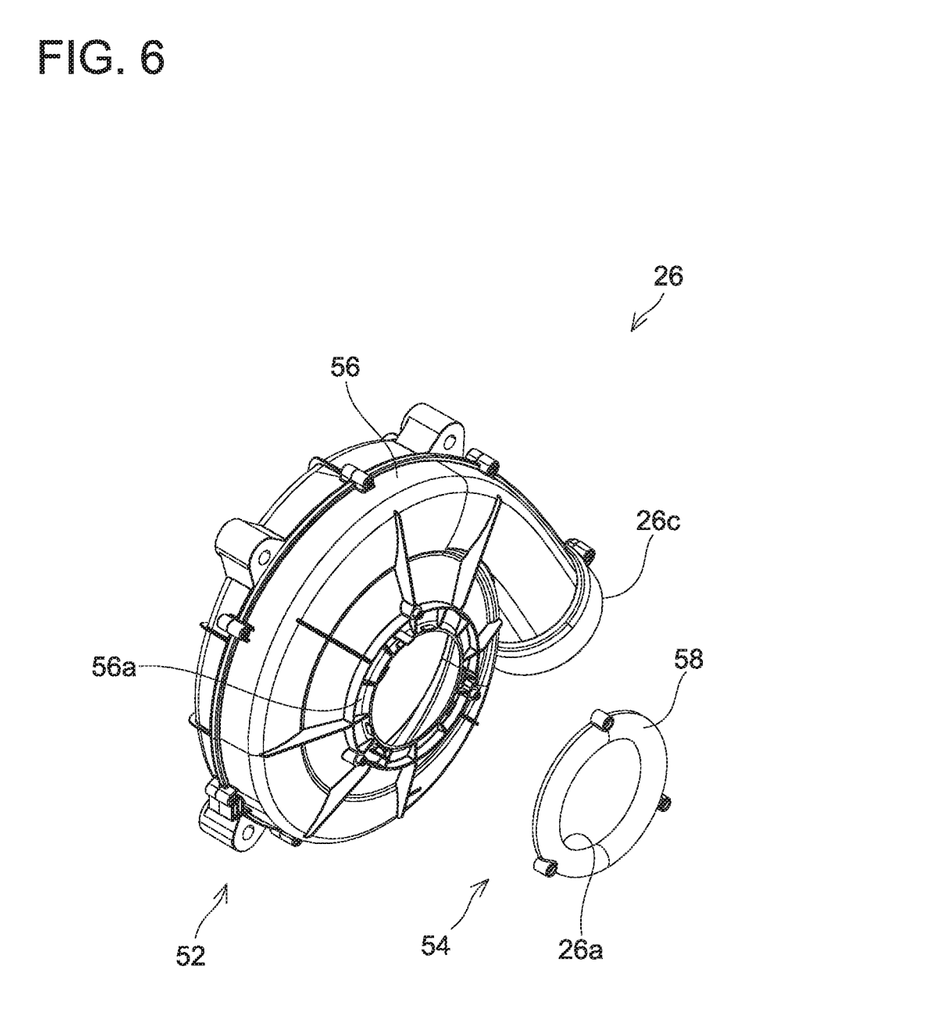
FIG. 6 is a disassembled perspective view of the volute case.

Next, the structure of the volute case 26 will be described with reference to FIGS. 5 and 6. As shown in FIGS. 5 and 6, the volute case 26 includes a case body 52 defining the volute chamber 26b, and a bell mouth 54 protruding from the case body 52 and defining the suction port 26a. The bell mouth 54 has a truncated cone shape of which cross-sectional area increases from the suction port 26a toward the volute chamber 26b. The volute case 26 is constituted of a resin material, and is configured by combining a plurality of components. Although not particularly limited, each of these components is fabricated by mold injection.

In the volute case 26, a thickness required in the bell mouth 54 (especially at an end of the bell mouth 54) is larger than a thickness required in the case body 52. As such, if the bell mouth 54 is integrally fabricated with the case body 52, the resulting integrated component has an uneven thickness structure. In order to produce such a component with high accuracy using a mold, so-called thickness-reducing recesses may be formed at portions of the bell mouth 54 having the large thickness. However, disposing such thickness-reducing recesses at portions of the bell mouth 54 results in a large number of holes and grooves on a surface of the bell mouth 54, and they may cause a problem of whistling noise.

In regard to the above, the volute case 26 of the present embodiment is configured by combining the plurality of components. Especially, the plurality of components configuring the volute case 26 includes a first component 56 and a second component 58. The first component 56 configures at least a part of the case body 52. The second component 58 is assembled onto the first, component 56 and configures at least a part of the bell mouth 54, Configuring at least a part of the bell mouth 54 with a different component from the case body 52 can eliminate or suppress the uneven, thickness structure of the first component 56 configuring the case body 52, and eliminate the necessity of thickness-reducing recesses on the surface of the bell mouth 54. Due to this, the surface of the bell mouth 54 (especially a surface of a distal end portion of the bell mouth 54) can be made smooth.

In the present embodiment, the first component 56 further configures a part of the bell mouth 54, and the second component 58 is a ring-shaped member configuring the distal end portion of the bell mouth 54, although this is merely an example. With the second component 58 of the ring-shaped member, the suction port 26a of the volute case 26 can accurately be configured with a smooth surface.

In the present embodiment, a plurality of recesses 56a is formed in the first component 56. These are thickness-reducing recesses formed in the first component 56. Similarly, a plurality of recesses 58a is formed in the second component 58 as well. These are also thickness-reducing recesses formed in the second component 58. These recesses 56a, 58a are located at surfaces of the first component 56 and the second component 58 that are to come into contact with each other. Due to this, when the first component 56 and the second component 58 are combined with each other, these recesses 56a, 58a are located between the first component 56 and the second component 58 and thus are not exposed to the outside. Thus, the surface (inner surface) of the bell mouth 54 can be made smooth while forming the thickness-reducing recesses on each of the components 56, 58.

Figure 1:
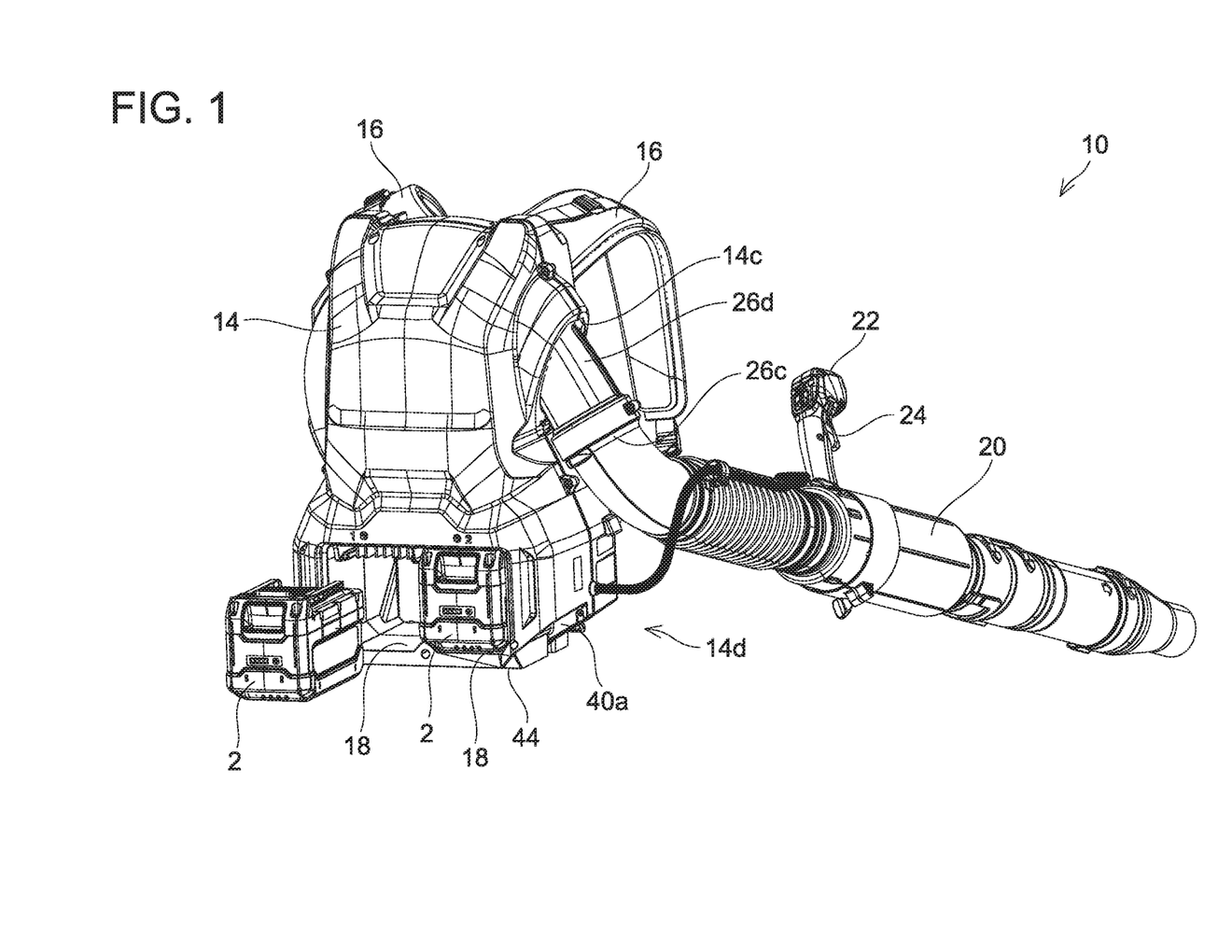
FIG. 1 is a perspective view showing an outer appearance of a blower 10 of an embodiment.
Figure 2:
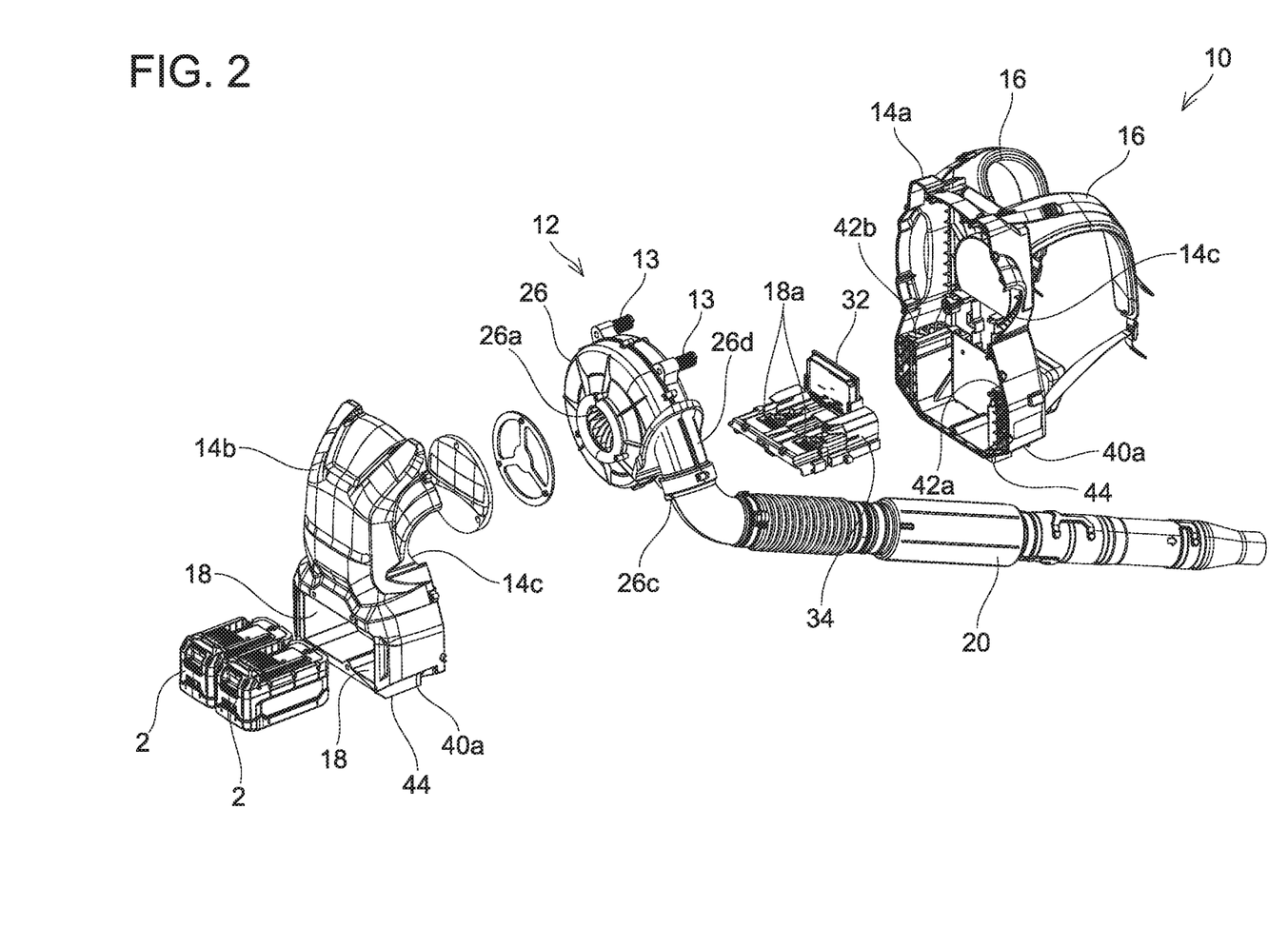
FIG. 2 is a disassembled perspective view of the blower 10.
Figure 3:
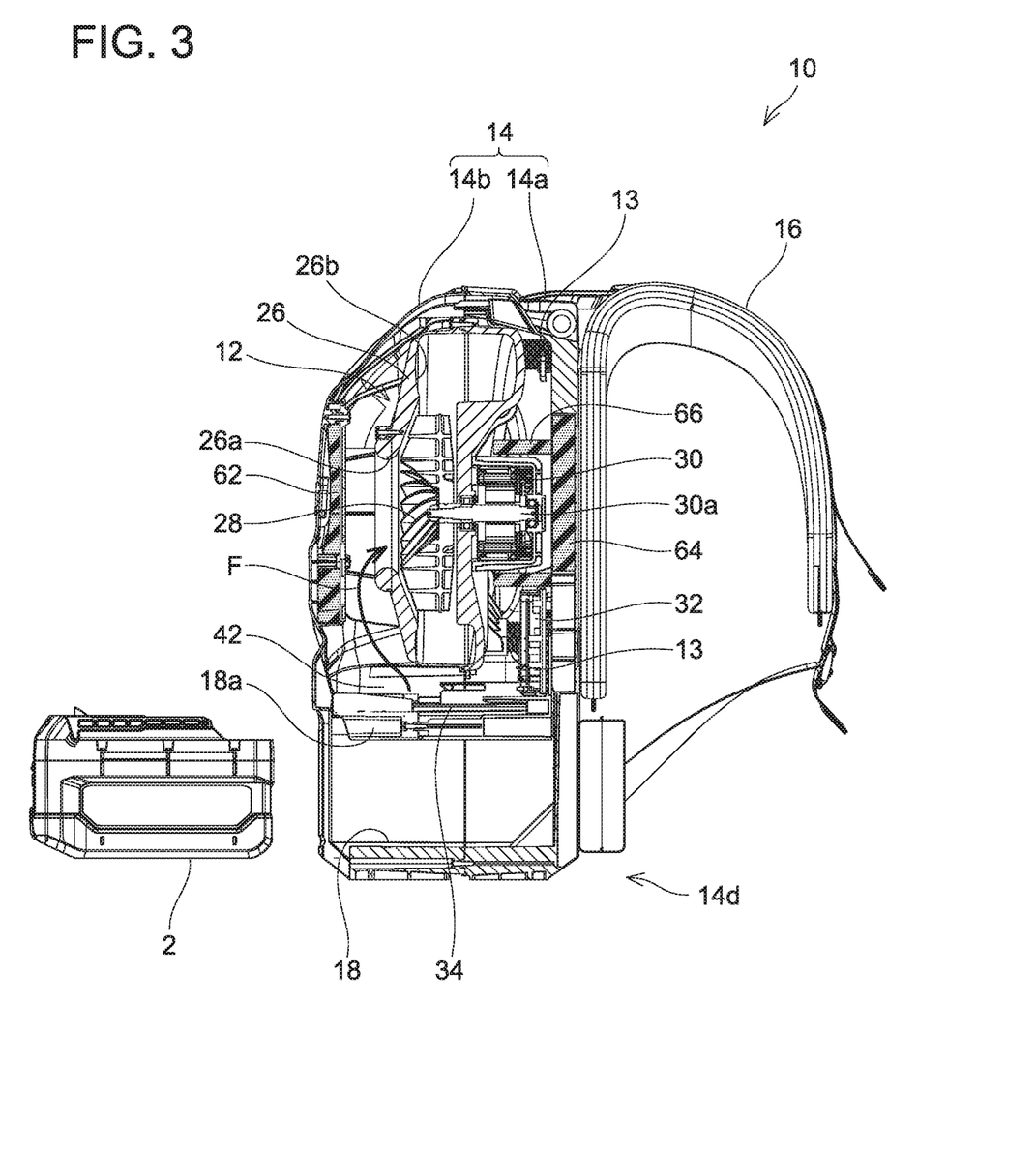
FIG. 3 is a cross-sectional view showing an internal structure of the blower 10. An arrow F in the drawing schematically shows an airflow in an air passage 42.
Figure 7:
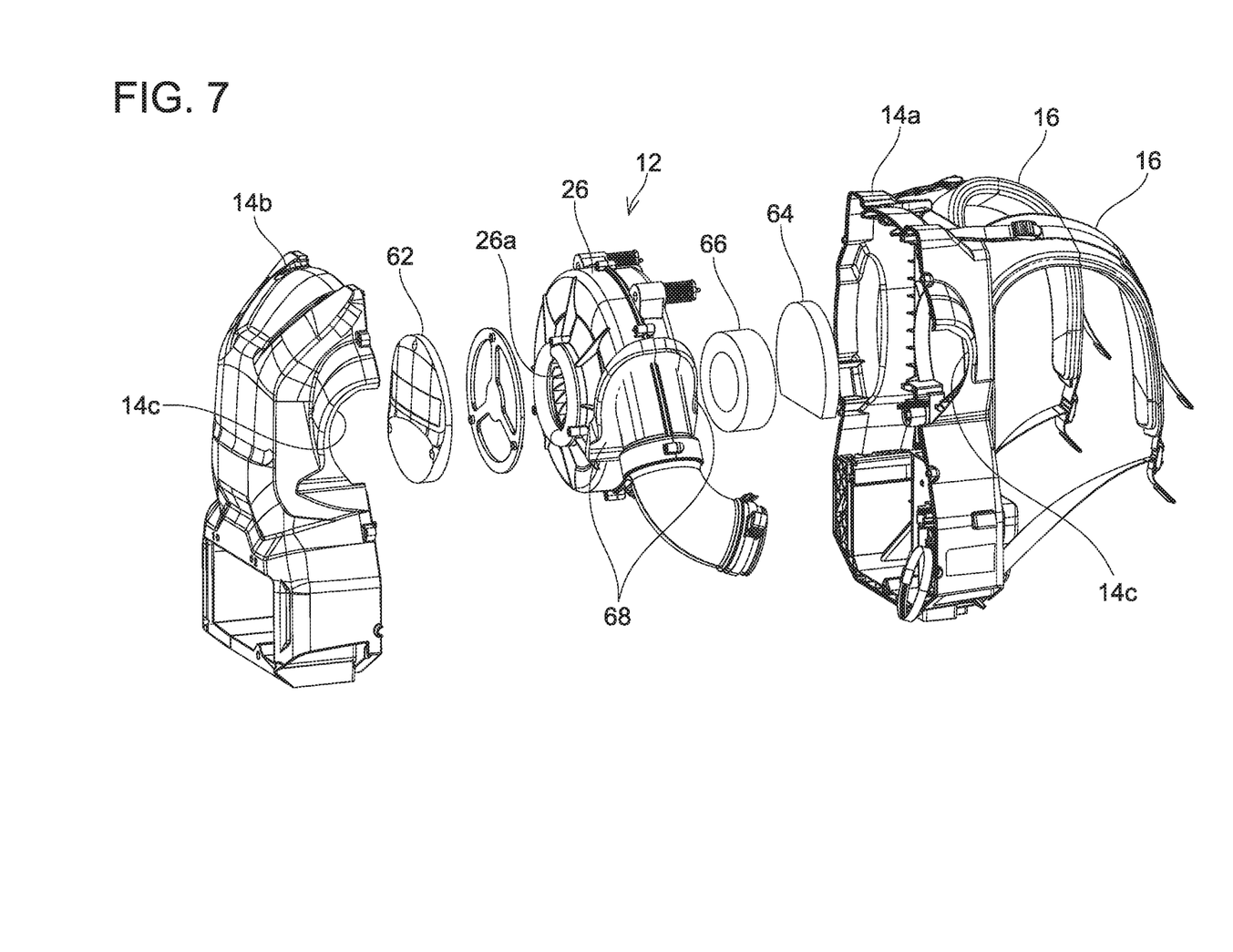
FIG. 7 is a disassembled perspective view of a part of the blower 10, and shows sound absorbing members 62, 64, 66, 68.

As shown in FIGS. 3, 4, and 7, the blower 10 includes a plurality of sound absorbing members 62, 64, 66, 68. The plurality of sound absorbing members 62, 64, 66, 68 is located within the outer case 14. The plurality of sound absorbing members 62, 64, 66, 68 includes the first sound absorbing member 62, the second sound absorbing member 64, the third sound absorbing member 66, and the fourth sound absorbing member 68. Each of the sound absorbing members 62, 64, 66, 68 is constituted of a sponge. The sponge mentioned herein refers broadly to spongy (or porous) materials, and constituting materials thereof are not particularly limited. The sound absorbing members 62, 64, 66, 68 may be constituted of various materials, such as resin materials and/or rubber materials.

The first sound absorbing member 62 is attached to an inner surface of the cover member 14b of the outer case 14 and faces the suction port 26a of the volute case 26. The first sound absorbing member 62 is located on an extended line of the rotation shaft 30a of the motor 30, and is capable of effectively absorbing the noise of the motor 30. As aforementioned, the impeller 28 is fixed to the rotation shaft 30a of the motor 30. Thus, the first sound absorbing member 62 is also located on an extended line of the rotation shaft of the impeller 28. The first sound absorbing member 62 has a disc shape in general.

The second sound absorbing member 64 is attached to an inner surface of the base member 14a of the outer case 14, and is located between the base member 14a and the motor 30. The second sound absorbing member 64 is also located on the extended line of the rotation shaft 30a of the motor 30, and is capable of effectively absorbing the noise of the motor 30. Further, the second sound absorbing member 64 is also located on the extended line of the rotation shaft of the impeller 28. The second sound absorbing member 64 opposes the first sound absorbing member 62 with the motor 30 interposed between them. Arranging the motor 30 between these two sound absorbing members 62, 64 enables effective absorption of the noise of the motor 30.

The third sound absorbing member 66 is attached to the base member 14a of the outer case 14. The third sound absorbing member 66 has a cylindrical shape, and is arranged to surround the motor 30 in radial directions perpendicular to the rotation shaft 30a of the motor 30. At least a part of the third sound absorbing member 66 may be integrally fabricated with the second sound absorbing member 64. Further, the third sound absorbing member 66 may not necessarily have the cylindrical shape, but may rather have, a simple plate shape and be disposed only at a portion of circumference whose center is the motor 30.

The fourth sound absorbing member 68 is attached to the discharge duct 26d of the volute case 26, and is disposed in the clearance between the discharge duct 26d of the volute case 26 and the duct opening 14c of the outer case 14. As aforementioned, the outer case 14 supports the volute case 26 via the plurality of vibration-proofing members 13. As such, the volute case 26 is displaceable relative to the outer case 14, and such a displacement requires the clearance between the discharge duct 26d and the duct opening 14c. However, the clearance between the discharge duct 26d and the duct opening 14c may cause the leakage of the noise of the motor 30 from the outer case 14 through the duct opening 14c. In this regard, the fourth sound absorbing member 68 can suppress such a noise leakage, while allowing the relative displacement of the volute case 26 since it is constituted of a soft sponge.

What is claimed is:

1. A blower configured to be held or worn in a predetermined posture by a user, the blower comprising:
    a volute case defining a suction port, a volute chamber, and a discharge port;
    an impeller rotatably supported within the volute chamber;

a motor connected to the impeller and configured to drive the impeller;

at least one battery pack configured to supply electric power to the motor;

a motor controller configured to control the electric power to be supplied to the motor;

an outer case accommodating the suction port of the volute case and the motor and configured to be detachably attached to the at least one battery pack, wherein the outer case comprises an external suction port and defines an air passage extending from the external suction port to the suction port of the volute case, the external suction port is located in the outer case such that the external suction port is directed to be open vertically downward when the blower is held or worn in the predetermined posture by the user, the air passage is configured such that at least a part of the air passage extends along the at least one battery pack or at least a part of the motor controller is exposed to the air passage, and an amount of air passing through the external suction port of the outer case that is directed to be open vertically downward is not less than 95 percent of an amount of air passing through the suction port of the volute case when the blower is held or worn in the predetermined posture by the user and the motor drives the impeller.

2. The blower according to claim 1, wherein
the suction port of the volute case is directed to be open horizontally when the blower is held or worn in the predetermined posture.

3. The blower according to claim 2, wherein
the outer case comprises a bottom portion facing a ground when the blower is in the predetermined posture, and
the external suction port is located at the bottom portion of the outer case.

4. The blower according to claim 3, wherein
the bottom portion of the outer case comprises a ground contact face configured to contact the ground when the user places the blower on the ground, and
at least a part of the external suction port is located at a position different from the ground contact face.

5. The blower according to claim 1, wherein
the outer case comprises a bottom portion facing a ground when the blower is held or worn in the predetermined posture, and
the external suction port is located at the bottom portion of the outer case.

6. The blower according to claim 5, wherein
the bottom portion of the outer case comprises a ground contact face configured to contact the ground when the user places the blower on the ground, and
at least a part of the external suction port is located at a position different from the ground contact face.

7. The blower according to claim 1, wherein the at least a part of the air passage extends along the at least one battery pack.

8. The blower according to claim 1, wherein
the external suction port comprises a first external suction port and a second external suction port,
the air passage comprises a first air passage extending from the first external suction port and a second air passage extending from the second external suction port, and
the at least one battery pack is located between the first air passage and the second air passage.

9. The blower according to claim 1, wherein the at least a part of the motor controller is exposed to the air passage.

10. The blower according to claim 1, wherein
the blower is a backpack blower configured to be worn in the predetermined posture on a back of the user.

11. The blower according to claim 10, wherein
when the blower is worn in the predetermined posture by the user, the motor is located between the user and the volute case and the suction port of the volute case is open rearward away from the user.

12. The blower according to claim 1, wherein
the external suction port comprises a first external suction port and a second external suction port,
the air passage comprises a first air passage extending from the first external suction port and a second air passage extending from the second external suction port,
the blower further comprises at least one battery pack located between the first air passage and the second air passage, and
each of the first air passage and the second air passage at least partly extends along the at least one battery pack.

13. The blower according to claim 12, wherein
the at least one battery pack comprises a first battery pack and a second battery pack,
the first air passage at least partly extends along the first battery pack, and
the second air passage at least partly extends along the second battery pack.

14. The blower according to claim 13, further comprising:
a motor controller configured to control electric power to be supplied to the motor,
wherein at least a part of the motor controller is exposed to the air passage.

15. A backpack blower configured to be worn in a predetermined posture on a back of a user, the backpack blower comprising:
a volute case defining a suction port, a volute chamber, and a discharge port;
an impeller rotatably supported within the volute chamber;
a motor connected to the impeller and configured to drive the impeller; and
an outer case accommodating the suction port of the volute case and the motor,
wherein
the outer case comprises two external suction ports and defines an air passage extending from each of the external suction ports to the suction port of the volute case,
the two external suction ports are located on opposite sides of the outer case in a left-right direction when the blower is held or worn in the predetermined posture by the user,
the two external suction ports are located in the outer case such that the two external suction ports are directed to be open vertically downward when the backpack blower is worn in the predetermined posture on the back of the user, and
an amount of air passing through the two external suction ports of the outer case that is directed to be open vertically downward is not less than 95 percent of an amount of air passing through the suction port of the volute case when the blower is held or worn in the predetermined posture by the user and the motor drives the impeller.

16. The backpack blower according to claim 15, wherein the suction port of the volute case is directed to be open horizontally when the backpack blower is worn in the predetermined posture on the back of the user.

17. The backpack blower according to claim 16, wherein
the outer case comprises a bottom portion facing a ground when the backpack blower is worn in the predetermined posture on the back of the user, and
the two external suction ports are located at the bottom portion of the outer case.

* * * * *